(12) United States Patent
Arboix

(10) Patent No.: US 7,559,657 B2
(45) Date of Patent: Jul. 14, 2009

(54) PROJECTION DEVICE

(75) Inventor: Esteban Arboix, Sundbyberg (SE)

(73) Assignee: InFocus Corporation, Wilsonville, OR (US)

( * ) Notice: Subject to any disclaimer, the term of this patent is extended or adjusted under 35 U.S.C. 154(b) by 391 days.

(21) Appl. No.: 11/343,616

(22) Filed: Jan. 30, 2006

(65) Prior Publication Data

US 2007/0177108 A1   Aug. 2, 2007

(51) Int. Cl.
*G03B 21/16* (2006.01)

(52) U.S. Cl. .......................... 353/61; 353/60

(58) Field of Classification Search .......... 353/57, 353/61, 62, 98, 60; 362/264, 294, 373, 217
See application file for complete search history.

(56) References Cited

U.S. PATENT DOCUMENTS

| | | | |
|---|---|---|---|
| 2,800,578 A | 7/1957 | Falge et al. | |
| 3,314,331 A | 4/1967 | Wlley et al. | |
| 3,582,641 A | 6/1971 | Choquette | |
| 3,621,235 A | 11/1971 | Appleton | |
| 3,761,170 A | 9/1973 | Genesky et al. | |
| 3,936,686 A | 2/1976 | Moore | |
| 4,156,901 A | 5/1979 | Haraden et al. | |
| 4,388,679 A | 6/1983 | Blaisdell et al. | |
| 4,586,117 A | 4/1986 | Collins | |
| 4,739,398 A | 4/1988 | Thomas et al. | |
| 4,841,422 A | 6/1989 | Groh | |
| 4,893,111 A * | 1/1990 | Roller | 340/471 |
| 4,985,815 A | 1/1991 | Endo | |
| 5,029,057 A | 7/1991 | Devir et al. | |
| 5,215,371 A | 6/1993 | Pileski | |
| 5,398,041 A | 3/1995 | Hyatt | |
| 5,420,769 A * | 5/1995 | Ahlgren et al. | 362/294 |
| 5,672,931 A | 9/1997 | Kiss et al. | |
| 5,707,143 A | 1/1998 | Hentz | |
| RE36,060 E | 1/1999 | Miyashita | |
| 5,873,650 A | 2/1999 | Luk et al. | |
| 5,876,105 A | 3/1999 | Rodriquez et al. | |
| 5,947,590 A | 9/1999 | Meuse et al. | |
| 6,056,405 A | 5/2000 | Heintz et al. | |
| 6,179,446 B1 * | 1/2001 | Sarmadi | 362/264 |
| 6,252,346 B1 * | 6/2001 | Turner et al. | 313/493 |
| 6,345,904 B1 | 2/2002 | Lu et al. | |
| 6,461,025 B1 | 10/2002 | Payne | |
| 6,472,828 B1 | 10/2002 | Pruett et al. | |
| 6,476,560 B2 | 11/2002 | Terami et al. | |
| 6,502,973 B1 | 1/2003 | Lam | |
| 6,508,556 B1 | 1/2003 | Ueda | |
| 6,595,005 B1 | 7/2003 | Immel | |
| 6,621,239 B1 | 9/2003 | Belliveau | |
| 6,637,895 B2 | 10/2003 | Fujimori et al. | |
| 6,840,633 B2 * | 1/2005 | Davis et al. | 353/98 |
| 6,863,418 B2 * | 3/2005 | Masuoka et al. | 362/264 |
| 6,863,421 B2 | 3/2005 | Gulliksen | |
| 6,874,914 B2 | 4/2005 | Desanto et al. | |

(Continued)

*Primary Examiner*—William C Dowling
*Assistant Examiner*—Danell L Owens
(74) *Attorney, Agent, or Firm*—Alleman Hall McCoy Russell & Tuttle LLP

(57) ABSTRACT

A projection device is disclosed, wherein the projection device includes a lamp housing having a front portion and a back portion, wherein the lamp housing is configured to accommodate a lamp, a blower system configured to direct a flow of air across the front portion of the lamp housing, and a heat sink in thermal communication with the back portion of the lamp housing.

20 Claims, 3 Drawing Sheets

U.S. PATENT DOCUMENTS

| | | |
|---|---|---|
| 6,886,942 B2 | 5/2005 | Okada et al. |
| 6,905,232 B2 | 6/2005 | Lin |
| 2003/0016541 A1 | 1/2003 | Kisiel |
| 2003/0218602 A1 | 11/2003 | Naito |
| 2005/0162618 A1* | 7/2005 | Morita et al. ................. 353/57 |
| 2006/0056182 A1* | 3/2006 | Murasugi ................... 362/294 |
| 2006/0175947 A1* | 8/2006 | Blondia et al. .............. 313/113 |

* cited by examiner ll
PROJECTION DEVICE

TECHNICAL FIELD

The present disclosure relates to a projection device, and more particularly to a lamp housing assembly for a projection device.

SUMMARY

An embodiment of a projection device is disclosed, wherein the projection device includes a lamp housing assembly having a front portion and a back portion, wherein the lamp housing assembly is configured to accommodate a lamp, a blower system configured to direct a flow of air across the front portion of the lamp housing, and a heat sink in thermal communications with the back portion of the lamp housing.

DETAILED DESCRIPTION OF THE DEPICTED EMBODIMENTS

Figure 1:
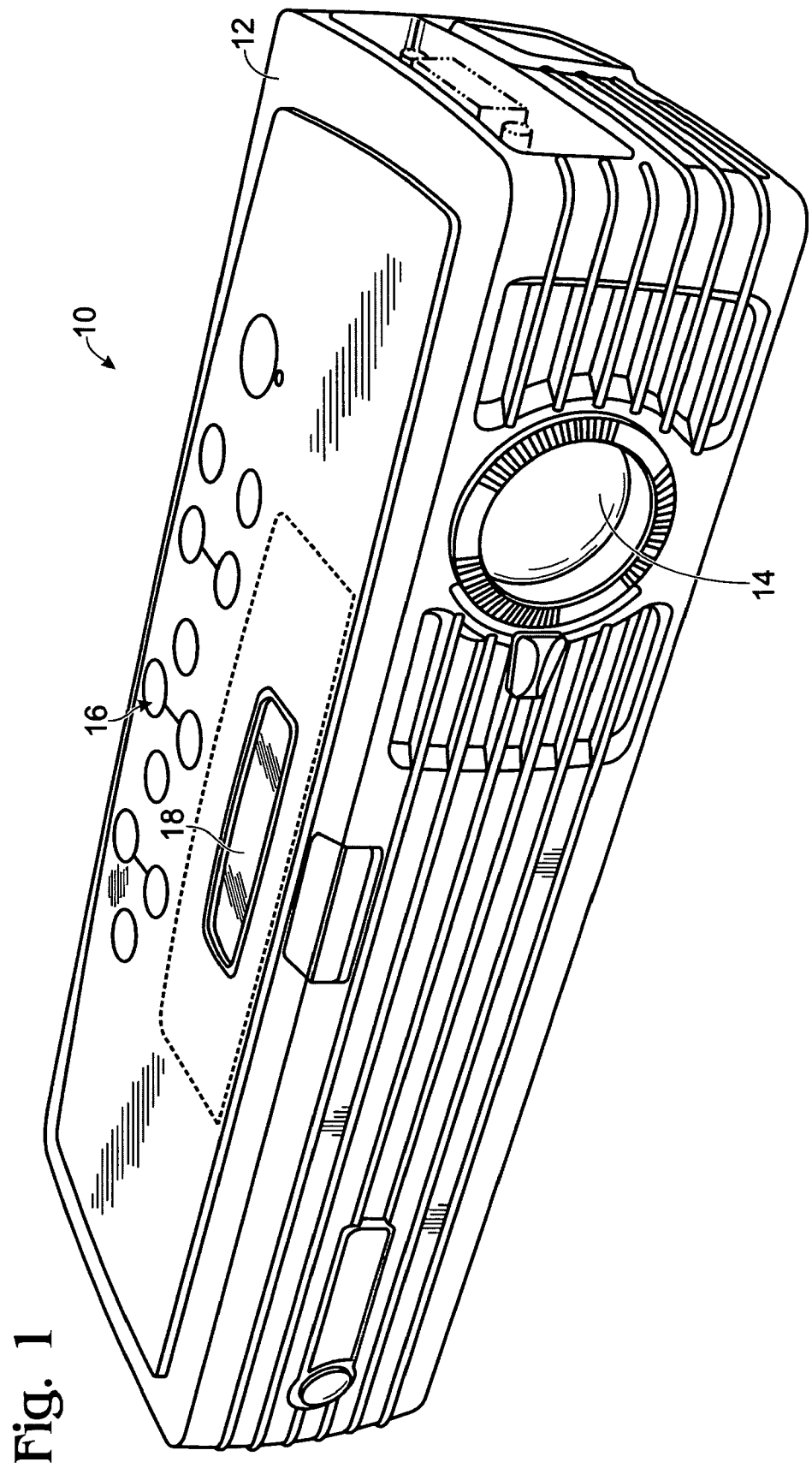
FIG. 1 shows an exemplary embodiment of a projection device.

FIG. 1 shows, generally at 10, an exemplary embodiment of a projection device, in the form of a digital image projector. Projection device 10 includes a body 12 containing the optical, electrical and other components of projection device 10. Projection device 10 also includes a lens 14 for projecting an image onto a viewing surface, and one or more inputs 16 for accepting various inputs from a user. Projection device 10 additionally may include a display 18 for displaying information to a user. Such information may include, but is not limited to, a status of the projection device, a status of an input device connected to the projection device, a current date/time, an error message, an identity of the projection device, etc. While the embodiment of FIG. 1 is depicted as a portable front projection device, it will be appreciated that the projection device may also take the form of a larger front projection device intended for a more permanent installation, a rear projection device such as a projection television, etc.

Figure 2:
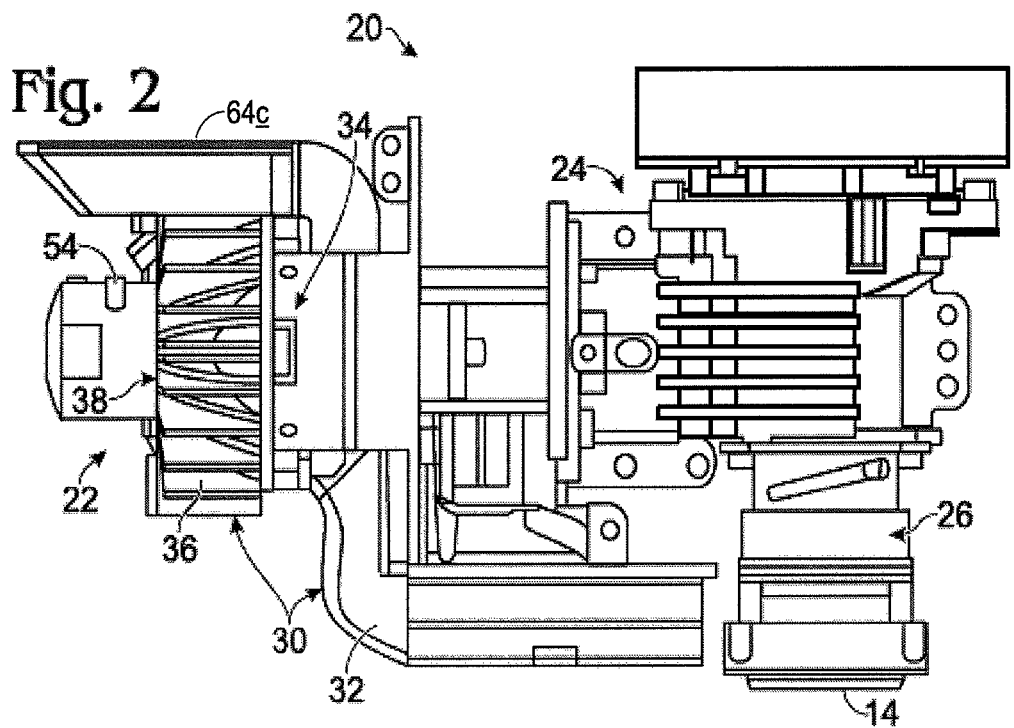
FIG. 2 shows a top view of an exemplary embodiment of an optical system for a projection device.

FIG. 2 shows, generally at 20, an exemplary embodiment of an optical system suitable for use with projection device 10. Optical system 20 includes a lamp housing assembly 22, an optical engine 24, and a projection lens assembly 26 (which includes lens 14). Lamp housing assembly 22 is configured to house and provide power connections to a lamp housed within lamp housing assembly 22 for producing a beam of light. Optical engine 24 is configured to produce an image from the beam of light, and typically includes various optics related to image generation. Examples of optics contained by optical engine 24 include, but are not limited to, one or more lenses, a color wheel or other light modulator, an integrator for smoothing intensity variations within the beam of light, one or more image producing elements such as a digital micromirror device, a liquid crystal display panel, an LCOS (liquid crystal on silicon) panel, etc. It will be appreciated that this list of components is merely exemplary, and that projection device 12 may include any suitable component or components.

FIG. 2 also shows an exemplary embodiment of a cooling system, generally at 30, for cooling lamp housing assembly 22. Cooling system 30 includes a blower/duct assembly 32 for cooling a front portion 34 of lamp housing assembly 22, and a heat sink 36 for cooling a rear portion 38 of lamp housing assembly 22.

Figure 3:
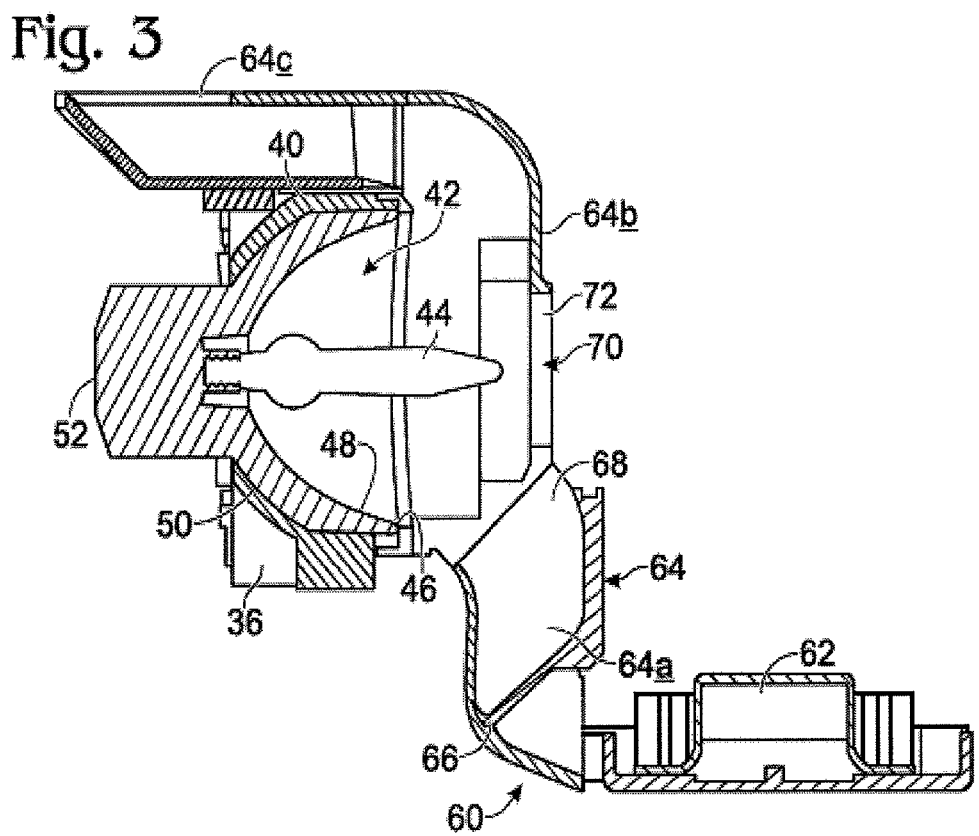
FIG. 3 shows a top view of the lamp housing assembly and lamp housing assembly cooling system of the embodiment of FIG. 2.
Figure 4:
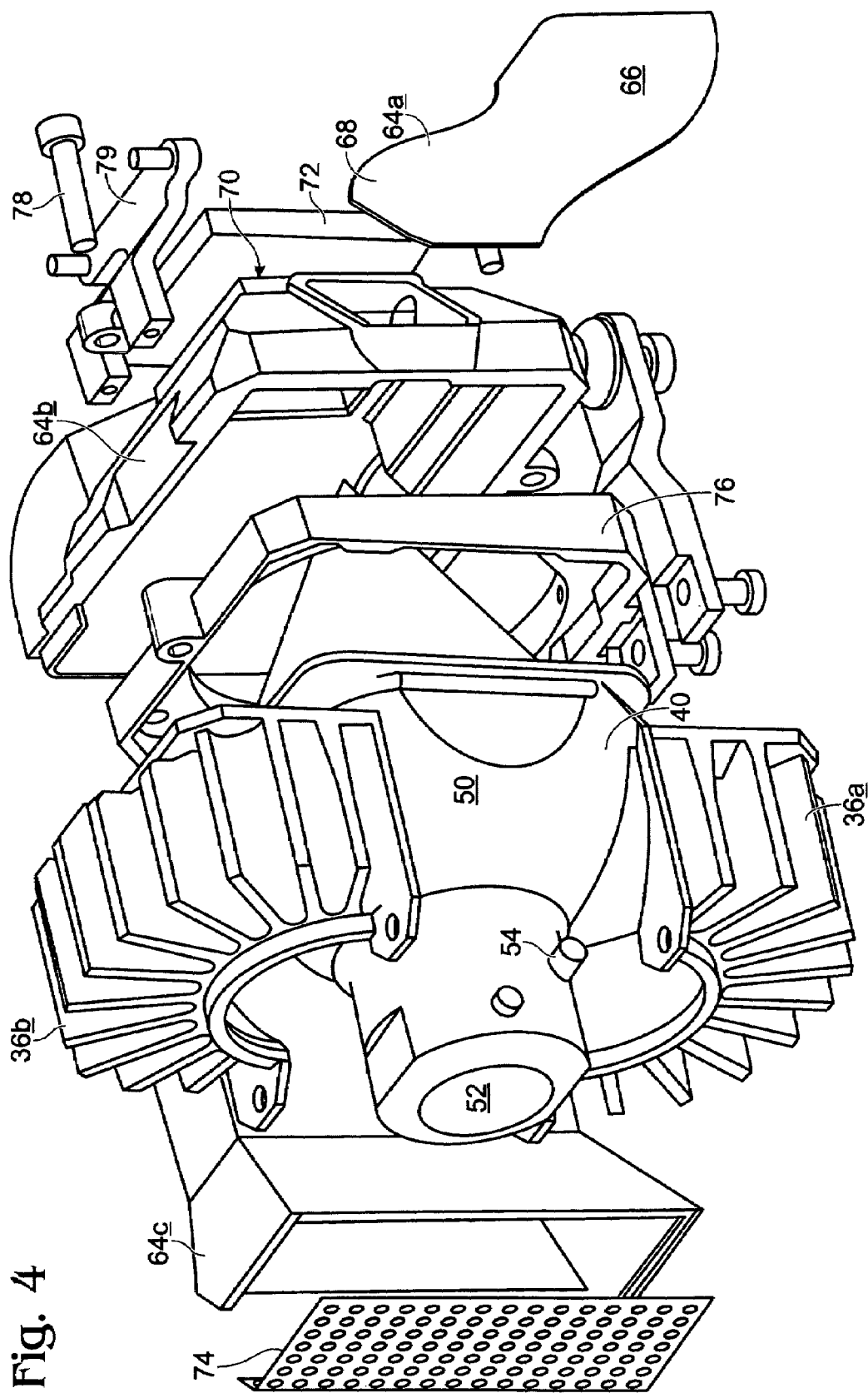
FIG. 4 shows an exploded view of the lamp housing assembly and a portion of the lamp housing assembly cooling system of the embodiment of FIG. 2.

FIGS. 3 and 4 show cooling system 30 and lamp housing assembly 22 in more detail. Front portion 34 of lamp housing assembly 22 includes a reflector body 40 having a cavity or interior 42 for holding a lamp 44, and an opening 46 to admit a flow of cooling air into reflector body 40. Reflector body 40 further includes an inner reflective surface 48 for reflecting light emitted by lamp 42 through opening 46 and toward optical engine 24. Rear portion 38 of lamp housing assembly 22 includes an outer surface 50 of reflector body 40, and also includes a lamp base or fitting 52. Lamp base 52 may include electrical contacts (shown at 54 in FIG. 2) for establishing an electrical connection to lamp 44.

Referring again to FIG. 3, blower system 32 includes a blower 62 for generating a flow of air, and a duct 64 for directing the flow of air across and into front portion 34 of lamp housing assembly 22. Blower 62 may be any suitable type of blower, including but not limited to fan-type and wheel-type blowers. Blower 62 may be configured to pull cool air from outside of projection device 10 through a vent in body 12 for circulation through front portion 34 of lamp housing assembly 22, or may be configured to pull air from a location inside of body 12.

Duct 64 may have any suitable configuration for directing airflow from blower 62 to front portion 34 of lamp housing assembly 22. In the depicted embodiment, duct 64 includes an inlet duct section 64a extending from blower 62 to front portion 34 of lamp housing assembly 22, a middle duct section 64b connected to reflector body 40 to contain cooling air that flows across reflector body 40, and an exhaust duct section 64c extending from middle duct section 64b.

Inlet duct section 64a directs air from blower 62 across and into front portion 34 of lamp housing assembly 22. Inlet duct section 64a may have any suitable configuration for directing cooling air into lamp housing assembly 22. For example, inlet duct section 64a may be configured to direct air straight across lamp housing assembly 22 in a direction generally perpendicular to a long axis of lamp 44 (which extends generally along an optical axis of device 10). Alternatively, inlet duct section 64a may be configured to direct air in a direction at least partially along the long axis of lamp 44, thereby directing at least a portion of the flow of air into interior 42 of reflector body 40. In the depicted embodiment, inlet duct section 64a includes a first curved portion 66 and second curved portion 68 that directs the flow of air into interior 42 of reflector body 40 and onto lamp 44. While curved portions 66 and 68 of inlet duct 64a are depicted as being smoothly curved, it will be appreciated that inlet duct 64a may also be angled or curved in any other suitable manner. Furthermore, depending upon the relative positions of blower 62 and reflector 64, inlet duct 64a may be configured to direct a flow of air straight from blower 62 into interior 42 without any angled or curved portions of inlet duct 64a.

Interior 42 of the depicted embodiment is configured such that all air that flows into interior 42 from inlet duct 64a flows out via exhaust duct 64c. This is opposed to many prior systems, in which air can flow out of the rear portion of the reflector interior via holes provided in lamp base 52. In these prior designs, both the front and rear portions of the lamp housing assembly may be cooled by a flow of air from a blower, without the use of heat sink 36, which may be less effective and/or efficient than the disclosed forced air/heat sink combination cooling system.

Middle duct section 64b is configured to contain air delivered from blower 62 by inlet duct 64a, and to channel air from inlet duct 64a toward exhaust duct 64c. Middle duct section 64b typically includes an opening or window 70 to allow light emitted by lamp 44 to reach optical engine 24. In the depicted embodiment, window 70 includes a glass or other transparent barrier 72 for containing glass from lamp 44 in the event of lamp failure. Barrier 72 further helps to contain air flow from blower 62 within the interior of middle duct section 64b and lamp housing assembly 22, thereby improving cooling efficiency. In the depicted embodiment, middle duct section 64b has a raised configuration to accommodate lamp 44, which protrudes from interior 42 of reflector body 40. However, middle duct section 64b may have any other suitable configuration. For example, in embodiments where the lamp does not protrude from the reflector body 40, middle duct section 64b may have a generally flat configuration rather than a raised configuration.

Middle duct section 64b may be permanently attached to reflector body 40, or may be removably attached to allow lamp 44 to be changed. Where middle duct section 64b is removably attached to reflector body 40, it may be removably attached in any suitable manner. Referring to FIG. 4, the middle duct section 64b of the depicted embodiment is coupled to reflector body 40 via a contact plate 76 disposed between middle duct section 64b and reflector body 40, and one or more screws 78 configured to be inserted through complementary openings in contact plate 76. One or more brackets 79 connectable to screws 78 may further be used to hold the duct and contact plate to reflector body 40. In the depicted embodiment, brackets 79 also hold glass barrier 72 in place relative to middle duct section 64b. Alternatively, glass barrier 72 may be held in place relative to middle duct section 64b in any other suitable manner.

Exhaust duct section 64c directs air out of lamp housing assembly 22 after the air has been used for cooling. Exhaust duct section 64c may be configured to vent the air into the interior of projection device body 12, or may be configured to vent the air outside of projection device body 12 via a vent (not shown) in projection device body 12. As shown in FIGS. 2-3, exhaust duct section 64c may extend substantially parallel to the long axis of the lamp along the edge of the heat sink 36 such that an S-shaped duct is provided. The exhaust duct section 64c may vent into the interior of the projection device body in close proximity to the heat sink. As shown in FIG. 4, exhaust duct section 64c may include a screen or other similar structure for containing glass from lamp 44 in the event of a lamp failure.

Referring again to FIGS. 3 and 4, heat sink 36 is formed from two semicircular sections 36a and 36b that are connected to form a substantially circular piece that substantially surrounds a portion of the outer surface. In the depicted embodiment, sections 36a and 36b are identical in structure and are symmetrical, thereby simplifying manufacturing and assembly of lamp housing assembly 22. However, it will be appreciated that heat sink 36 may be formed from either more or fewer sections, and that the sections may be symmetrical or asymmetrical. Likewise, the sections may be any other suitable shape than semicircular. The shape of the heat sink sections may be influenced at least partly by the geometry of rear portion 38 of lamp housing assembly 22.

Heat sink 36 may be formed from any suitable thermally conductive material. Examples include, but are not limited to, highly thermally conductive metallic materials. Likewise, heat sink 36 may include one or more structures configured to increase the surface area and the rate of heat dissipation of heat sink 36. In the depicted embodiment, heat sink 36 includes a plurality of radially-arranged fins. Alternatively, heat sink 36 may include fins arranged in any other suitable pattern, and/or may include any other suitable structure other than fins for increasing the surface area of heat sink 36.

Heat sink 36 may be configured to be in contact with outer surface 50 of reflector body 40 over at least part of outer surface 50. In general, without wishing to be bound by theory, the closer the proximity between heat sink 36 and outer surface 50 of reflector body 40, the more efficient the heat transfer between reflector body 40 and heat sink 36. Therefore, in some embodiments, heat sink 36 may be configured to be in contact with outer surface 50 of reflector body 40. Alternatively, heat sink 36 may be configured to be in close proximity to, but not in contact with, outer surface 50 of reflector body 40. In these embodiments, a heat-resistant material may be disposed between portions of outer surface 50 of reflector body 40 and heat sink 36 (for example, as gaskets or spacers) to hold the heat sink and the reflector in desired positions relative to one another. Such a configuration may achieve good heat transfer between heat sink 36 and reflector body 40 while allowing for simplified manufacturing. Any suitable heat-resistant material may be used in such a configuration. Examples include, but are not limited to, perfluoro rubbers. Furthermore, a thermally conductive material may be disposed between heat sink 36 and outer surface 50 of reflector body 40 to further improve the conduction of heat from reflector body 40 to heat sink 36. Examples of such a thermally conductive material include, but are not limited to, thermally conductive pastes, adhesives, metals, polymers, etc.

The combination of forced air cooling for front portion 34 of lamp housing assembly 22 and heat sink cooling for back portion 38 of lamp housing assembly 22 may offer improved cooling relative to prior projection devices that utilize a single forced air system for cooling both the front and back portions of lamp housings. Furthermore, an additional blower (not provided) may be disposed adjacent heat sink 36 for creating an air flow across heat sink 36, thereby helping to further cool lamp housing assembly 22.

Furthermore, although the present disclosure includes specific embodiments, specific embodiments are not to be considered in a limiting sense, because numerous variations are possible. The foregoing embodiments are illustrative, and no single feature, component, or action is essential to all possible combinations that may be claimed in this or later applications. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "a" or "a first" element or the equivalent thereof. Such claims should be understood to include incorporation of one or more such elements, neither requiring nor excluding two or more such elements. Further, ordinal numbers, such as first, second, and third, for identified elements or actions are used to distinguish between the elements and actions, and do not indicate a required or limited number of such elements or actions, nor a particular position or order of such elements or actions unless otherwise specifically stated. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projection device, comprising:
   a lamp housing having a front portion and a back portion, the front portion including a reflector body, wherein the lamp housing is configured to accommodate a lamp in the reflector body;
   a blower system configured to direct a flow of air across the front portion of the lamp housing, the blower system including an exhaust duct; and
   a heat sink, located directly proximal to an outer surface of the reflector body, in thermal communication with the back portion of the lamp housing, wherein the exhaust duct extends substantially parallel to the lamp housing and the exhaust duct vents into the interior of the projection device in close proximity to the heat sink.

2. The projection device of claim 1, wherein the front portion of the lamp housing defines a generally conical recess, and wherein the blower system is configured to direct the flow of air into the recess.

3. The projection device of claim 1, wherein the blower system includes a blower configured to produce a flow of air, and a duct extending from the blower to the front portion of the lamp housing.

4. The projection device of claim 3, wherein the duct includes a curved portion configured to direct the flow of air into a front opening of the lamp housing.

5. The projection device of claim 1, wherein the heat sink contacts the back portion of the lamp housing.

6. The projection device of claim 1, wherein a thermally conductive material is disposed between the heat sink and the back portion of the lamp housing.

7. The projection device of claim 1, wherein the heat sink substantially surrounds the back portion of the lamp housing.

8. The projection device of claim 1, wherein the lamp housing is configured to cause air that is directed across the reflector by the blower system to flow out of the front portion of the lamp housing.

9. A projection device, comprising:
   a lamp housing having a front portion and a back portion, the lamp housing being configured to accommodate a lamp;
   a blower system configured to direct a flow of air through the front portion of the lamp housing; and
   a heat sink at least partially surrounding the back portion of the lamp housing, said heat sink having two semicircular sections that are connected to form a substantially circular piece, wherein the blower system further includes an exhaust duct that extends substantially parallel to the lamp housing and the exhaust duct vents into the interior of the projection device in close proximity to the heat sink.

10. The projection device of claim 9, wherein the lamp housing is configured to cause air blown into the front portion of the lamp housing to exit the lamp housing out of the front portion of the lamp housing.

11. The projection device of claim 9, wherein the heat sink is in contact with the back portion of the lamp housing.

12. The projection device of claim 9, wherein a thermally conductive material is disposed between the heat sink and the back portion of the lamp housing.

13. The projection device of claim 9, wherein the blower system includes a blower configured to generate a flow of air, and a duct extending between the blower and the front portion of the lamp housing.

14. The projection device of claim 13, wherein the duct includes a curved portion configured to direct the flow of air into a front opening of the housing.

15. A lamp housing system for a projection device, comprising:
   a lamp fitting;
   a reflector configured to at least partially surround a lamp disposed in the lamp fitting;
   a duct configured to be coupled to a front portion of the lamp housing to direct a flow of air across the reflector, said duct including an inlet duct section configured to direct air in a direction perpendicular to a long axis of the lamp, a middle duct section configured to contain air delivered by the inlet duct section and to channel air from the inlet duct section toward an exhaust duct section, and an exhaust duct section, substantially parallel to the long axis of the lamp and including a screen to contain glass in the event of a lamp failure, the exhaust duct section being configured to vent the air into the interior of the projection device; and
   a heat sink configured to be disposed at least partially around a back portion of the lamp housing, wherein the exhaust duct section vents air in close proximity to the heat sink.

16. The lamp housing system of claim 15, wherein the heat sink is configured to substantially surround the back portion of the lamp housing.

17. The lamp housing system of claim 15, wherein the duct includes a curved section configured to direct a flow of air into a front opening of the lamp housing.

18. The lamp housing system of claim 15, wherein the front portion of the lamp housing is configured to direct the flow of air back out of the front opening of the housing.

19. The lamp housing system of claim 15, wherein at least a portion of the heat sink is in contact with the back portion of the lamp housing.

20. The lamp housing system of claim 15, further comprising a thermally conductive material disposed between the heat sink and the back portion of the lamp housing.

* * * * *